United States Patent
Eckermann (10) Patent No.: US 12,332,820 B2
(45) Date of Patent: Jun. 17, 2025

(54) METHOD AND APPARATUS FOR PERFORMING ADDRESS TRANSLATIONS USING A REMAPPING PROCESS

(71) Applicant: NXP B.V., Eindhoven (NL)

(72) Inventor: Benjamin Charles Eckermann, Bee Cave, TX (US)

(73) Assignee: NXP B.V., Eindhoven (NL)

( * ) Notice: Subject to any disclaimer, the term of this patent is extended or adjusted under 35 U.S.C. 154(b) by 89 days.

(21) Appl. No.: 17/990,335

(22) Filed: Nov. 18, 2022

(65) Prior Publication Data

US 2024/0168907 A1    May 23, 2024

(51) Int. Cl.
| | | |
|---|---|---|
| *G06F 13/40* | (2006.01) | |
| *G06F 12/02* | (2006.01) | |
| *G06F 12/06* | (2006.01) | |
| *G06F 12/1009* | (2016.01) | |
| *H04L 61/09* | (2022.01) | |
| *H04L 61/5053* | (2022.01) | |

(52) U.S. Cl.
CPC ........ *G06F 13/404* (2013.01); *G06F 13/4009* (2013.01)

(58) Field of Classification Search
CPC ............................ G06F 9/45504; G06F 9/3001
See application file for complete search history.

(56) References Cited

U.S. PATENT DOCUMENTS

| | | | | |
|---|---|---|---|---|
| 5,392,408 A * | 2/1995 | Fitch | ................... | G06F 9/45504 |
| | | | | 712/E9.055 |
| 9,940,123 B1 * | 4/2018 | Ayoub | ................ | G06F 13/4295 |
| 10,262,754 B2 * | 4/2019 | Cheriton | ............. | G06F 11/1068 |
| 11,663,008 B2 * | 5/2023 | Lee | ..................... | G06F 15/7821 |
| | | | | 712/208 |
| 11,693,585 B2 * | 7/2023 | Fishwick | .............. | G06F 3/0611 |
| | | | | 711/154 |
| 2004/0260906 A1 * | 12/2004 | Landin | ................ | G06F 12/0284 |
| | | | | 711/E12.066 |
| 2015/0074339 A1 * | 3/2015 | Cheriton | ............. | G06F 12/0804 |
| | | | | 711/103 |
| 2018/0210842 A1 | 7/2018 | Nuzman et al. | | |
| 2018/0329832 A1 * | 11/2018 | Takaku | ................. | G06F 9/3001 |
| 2020/0167291 A1 * | 5/2020 | Asaro | ................. | G06F 12/1009 |
| 2021/0334213 A1 | 10/2021 | Dorris | | |

OTHER PUBLICATIONS

"ARM® System Memory Management Unit Architecture Specification SMMU architecture version 3.0 and version 3.1", ARM Limited, http://www.arm.com, Sep. 15, 2016, 427 pp.

* cited by examiner

*Primary Examiner* — Getente A Yimer (57) ABSTRACT

Aspects of the subject disclosure may include, for example, remapping a first address bus into a first remapped address bus by replacing bit lines of the first address bus with attribute bit lines, the first remapped address bus supplying updated address information, connecting the first address remapped bus to an address translation unit (ATU), the ATU configured to translate the updated address information into translated address information supplied to a second address bus, and remapping the second address bus into a second remapped address bus by replacing a portion of the second address bus with the bit lines of the first address bus that were replaced by the attribute bit lines, the second remapped address bus changing the translated address information into updated translated address information.

23 Claims, 6 Drawing Sheets

METHOD AND APPARATUS FOR PERFORMING ADDRESS TRANSLATIONS USING A REMAPPING PROCESS

FIELD OF THE DISCLOSURE

The subject disclosure relates to a method and apparatus for performing address translations.

BACKGROUND

Address translation units are commonly used by operating systems to translate one address domain into another address domain. In some instances, the other address domain is larger than the original address domain, thereby enabling the operating system to shift to an expanded number of address domains.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for performing address translations. Other embodiments are described in the subject disclosure.

One or more aspects of the subject disclosure include a method for receiving addressable information on an address bus, receiving attribute information on an attribute bus having a number of attribute bit lines, remapping the address bus into a first remapped address bus by replacing bit lines of the address bus with the attribute bit lines of the attribute bus, the replacing resulting in substitute bit lines and remaining bit lines of the address bus, the first remapped address bus comprising the substitute bit lines and the remaining bit lines of the address bus, and the first remapped address bus supplying updated address information, connecting the first remapped address bus to an address translation unit (ATU), the ATU configured to translate the updated address information into translated address information supplied to an expanded address bus, and remapping the expanded address bus into a second remapped address bus by replacing bit lines of the expanded address bus with the bit lines of the address bus that were replaced by the attribute bit lines, the replacing resulting in restored bit lines and remaining bit lines of the expanded address bus, the second remapped address bus comprising the restored bit lines and the remaining bit lines of the expanded address bus, and the second remapped address bus supplying updated translated address information.

One or more aspects of the subject disclosure include an integrated circuit device having a first address bus, and an address translation unit (ATU). The integrated circuit can be configured for remapping the first address bus into a first remapped address bus by replacing bit lines of the first address bus with attribute bit lines of an attribute bus, the replacing resulting in substitute bit lines and remaining bit lines of the first address bus, and the first remapped address bus comprising the substitute bit lines and the remaining bit lines of the first address bus, and the first remapped address bus supplying updated first address information, connecting the first remapped address bus to the ATU, the ATU configured to translate the updated first address information into translated address information supplied to a second address bus, and remapping the second address bus into a second remapped address bus by replacing a portion of the second address bus with the bit lines of the first address bus that were replaced by the attribute bit lines, the replacing resulting in restored bit lines and remaining bit lines of the second address bus, the second remapped address bus comprising the restored bit lines and the remaining bit lines of the second address bus, and the second remapped address bus supplying updated translated address information.

One or more aspects of the subject disclosure include a method for remapping a first address bus into a first remapped address bus by replacing bit lines of the first address bus with attribute bit lines of an attribute bus, the first remapped address bus supplying updated address information, connecting the first remapped address bus to an address translation unit (ATU), the ATU configured to translate the updated address information into translated address information supplied to a second address bus, and remapping the second address bus into a second remapped address bus by replacing bit lines of the second address bus with the bit lines of the first address bus that were replaced by the attribute bit lines, the second remapped address bus changing the translated address information into updated translated address information.

Figure 1A:
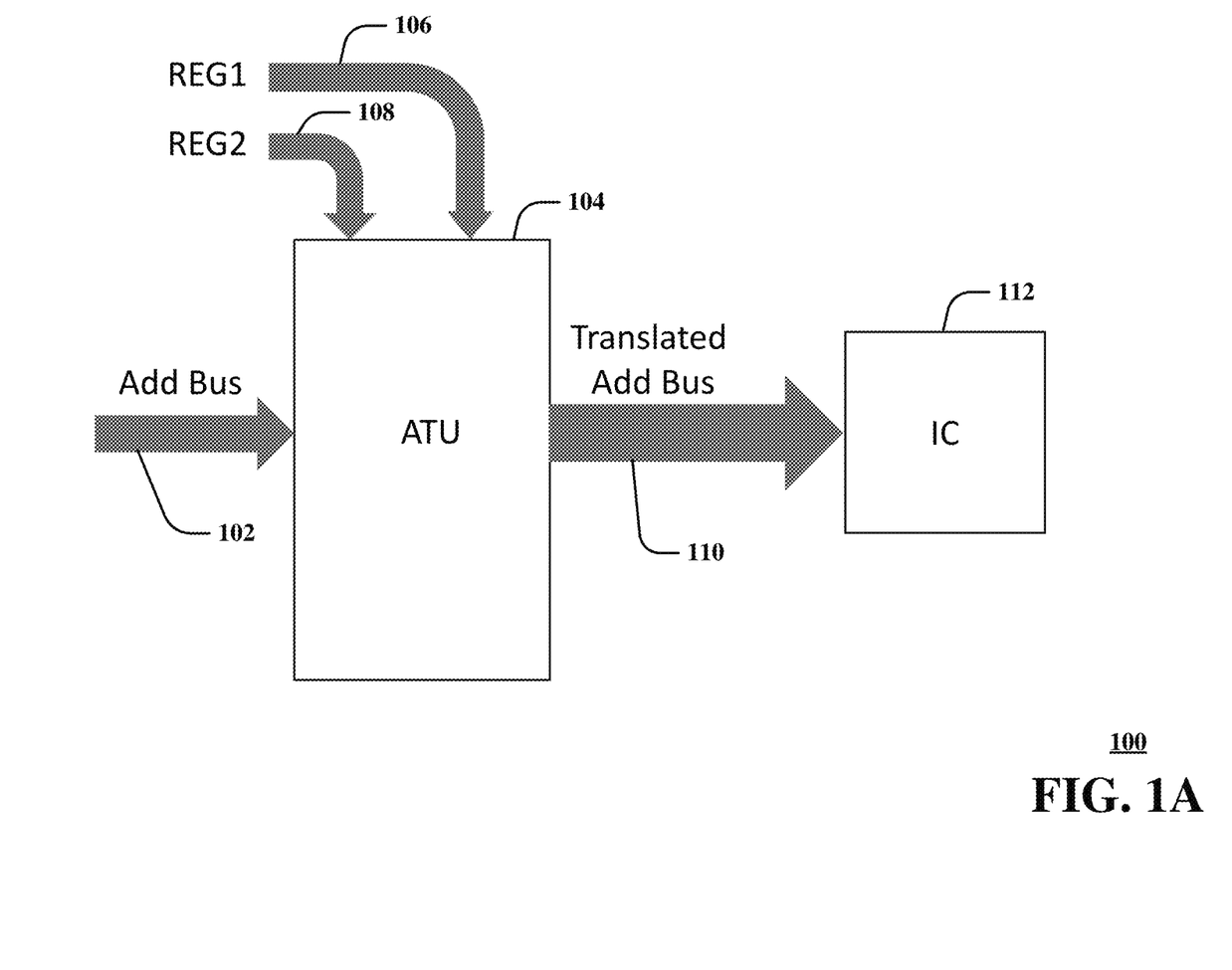
FIG. 1A is a block diagram illustrating an exemplary, non-limiting embodiment of an Address Translation Unit (ATU) in accordance with various aspects described herein.

FIG. 1A is a block diagram illustrating an exemplary, non-limiting embodiment of an Address Translation Unit (ATU) 104 in accordance with various aspects described herein. In one embodiment, the ATU 104 can be supplied from a first register (REG1) 106, a second register (REG2) 108 and an address bus 102. The first register (REG1) 106 can correspond to, for example, an outbound translated extended address register (herein referred to as OTEA register 106). The second register (REG2) 108 can correspond to an outbound window size register (herein referred to as OWS register 108). The OWS register 108 can be a five-bit register for identifying a window size in increments of 64 Kbytes increments*2' (where n is the value of the OWS register 108). This results in table entries ranging from, for example, 64 Kbytes (00000) to 2 GBytes (01111). The window size can be used by the ATU 104 as an index into a look-up table in the ATU 104 to determine a translation range for address information supplied by a set of bit lines of the address bus 102 (e.g., upper bit lines Addr[31: 16]).

If the ATU 104 determines that the address information supplied by the set of bit lines of the address bus 102 matches the translation range associated with the window size selected according to the OWS register 108, then the ATU 104 performs an address translation of the address information supplied by the set of bit lines of the address bus 102. If there is no match, then in one embodiment the ATU 104 performs a pass thru of the address information or supplies a default address supplied in the table entry selected by the OWS register 108. The result of the translation operation is supplied to a translated address bus 110 that may be the same size or larger than the address bus 102 (e.g., 32-bit address translated to a 64-bit address). The translated address bus 110 in turn can be connected in whole or in part to an Integrated Circuit (IC) 112 such as a volatile memory (e.g., DRAM, SRAM, etc.), non-volatile memory (e.g., Flash drive or SSD, Hard Disk Drive or HDD, etc.), or other suitable device that can make use of the translated address bus 110.

Figure 1B:
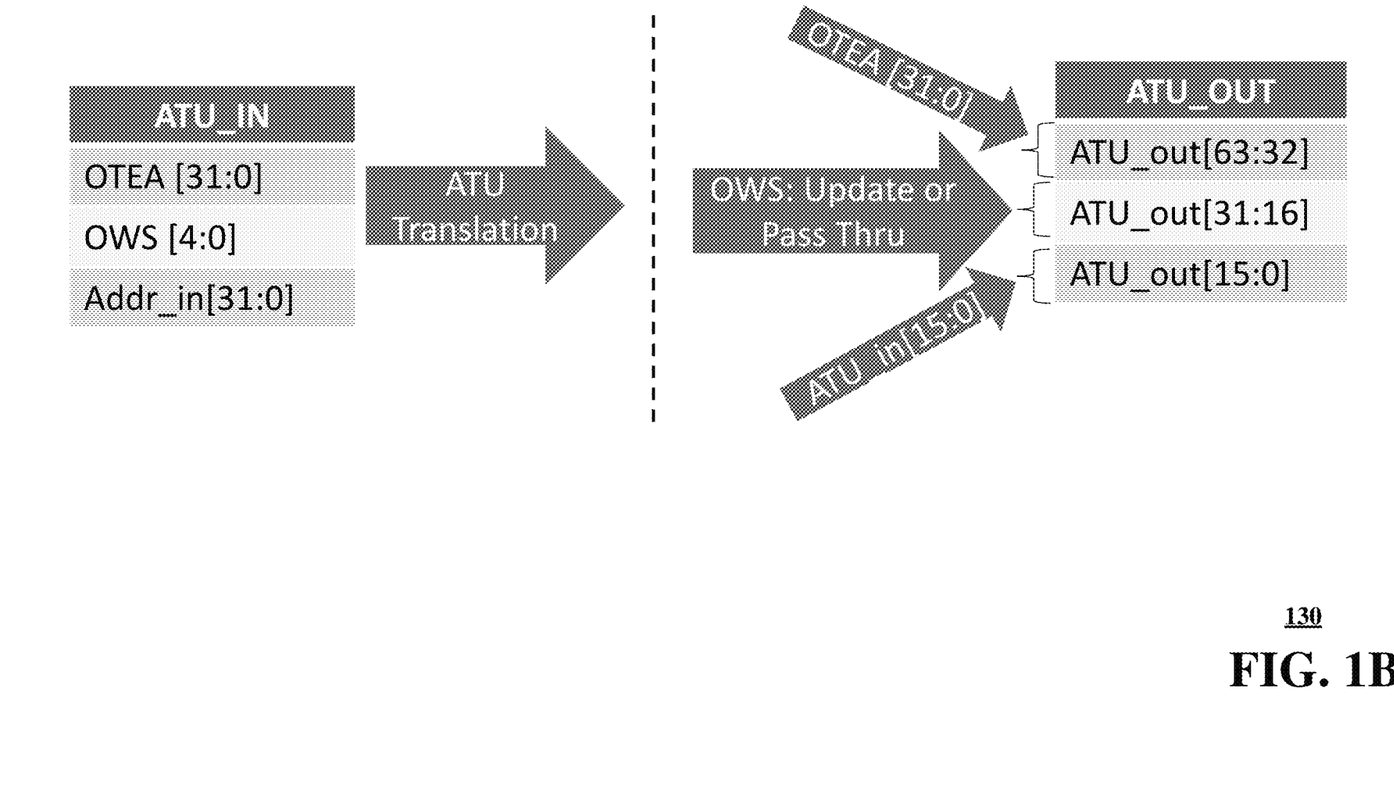
FIG. 1B is a block diagram illustrating an exemplary, non-limiting embodiment of the address translation performed by the ATU of FIG. 1A in accordance with various aspects described herein.

FIG. 1B is a block diagram illustrating an exemplary, non-limiting embodiment of the address translation performed by the ATU 104 of FIG. 1A in accordance with various aspects described herein. In this illustration, the input sources of the ATU 104 are the OTEA register 106 [31:0], the OWS register 108 [4:0] and the address bus 102 [31:0]. As depicted in FIG. 1B, the translated bus 110 (labeled as ATU_OUT in the table) corresponds to an expanded 64-bit bus. The upper 32 bits (ATU_out [63:32]) correspond to a pass-thru of the OTEA register [31:0]. Similarly, the lower 16 bits (ATU_out[15:0]) correspond to a pass-thru of the lower 16 bits of the address bus 102 (Addr_in [15:0]).

The OWS register 108 provides a window size to the ATU 104. The ATU 104 uses the window size to select a table entry having a given address range to determine whether the address information provided in the portion Addr_in [31:16] of the address bus 102 matches the address range in the selected table. If there is a match, the address information provided in Addr_in [31:16] is replaced with a pre-define address supplied by the table. The translation is then supplied to ATU_out [31:16]. If the address information in Addr_in [31:16] does not match the address range in the selected table, then the ATU 104 can be configured to pass-thru the address information in Addr_in [31:16] or a default address in the table that is supply to ATU_out [31:16]. All or a portion of the bit lines of the translated address bus 110 can be connected to one or more devices (e.g., volatile or non-volatile memories, or other devices) that can make use of the address translation.

It will be appreciated that the above illustrations can be adapted for larger or smaller address bus translations (e.g., 64-bit address bus translated to a 128-bit expanded address bus). The ATU 104 illustrations of FIGS. 1A-1B enable a selective translation of some or all addresses from one address space into another address space. Examples of its use include remapping a virtual address in a system running multiple virtual operating systems (OSes) to a physical address, and/or remapping a 32-bit address of a system memory map into a larger actual memory map.

Figure 2A:
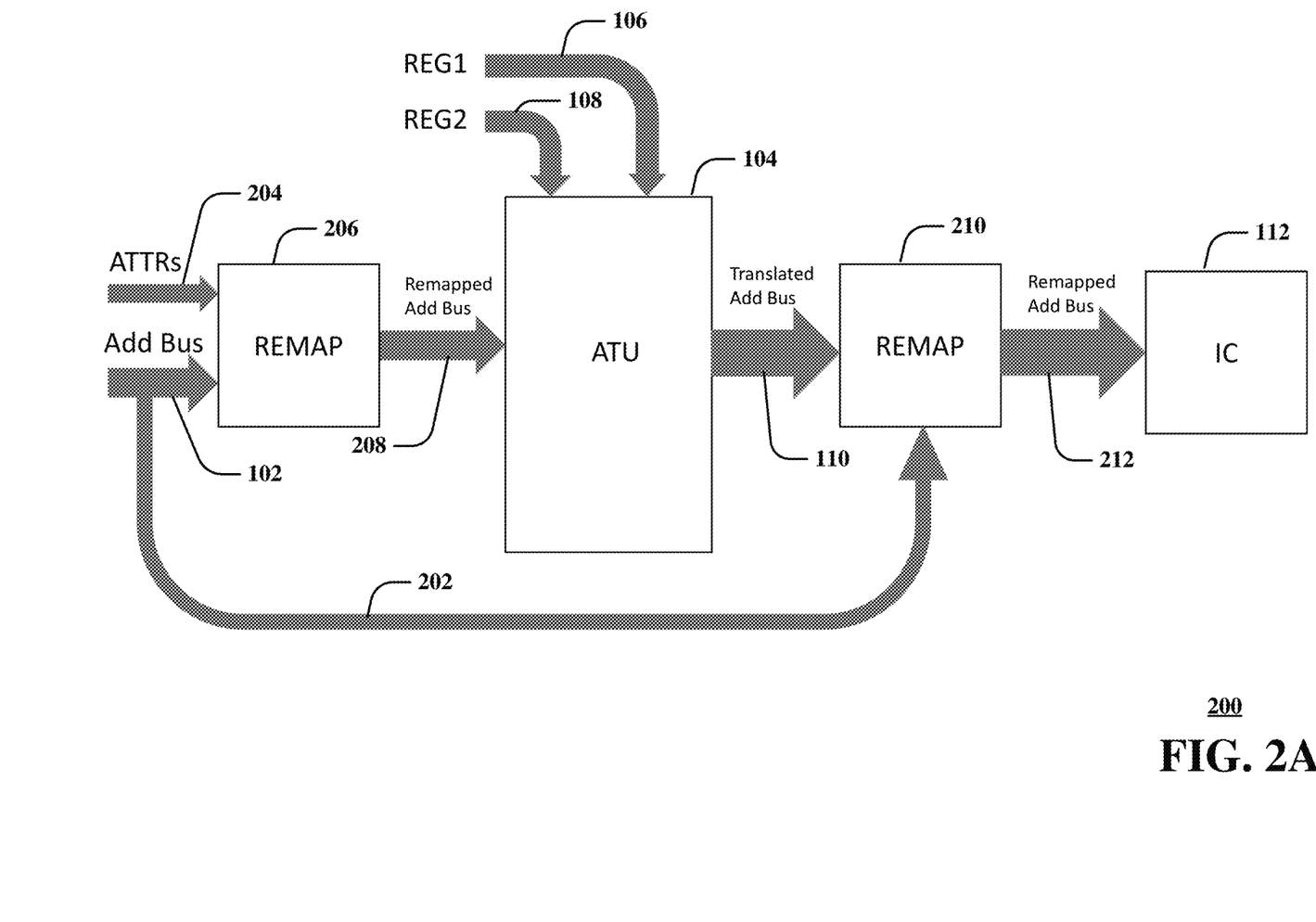
FIG. 2A is a block diagram illustrating an exemplary, non-limiting embodiment of an Address Translation System (ATS) in accordance with various aspects described herein.

FIG. 2A is a block diagram illustrating an exemplary, non-limiting embodiment of an Address Translation System (ATS) 200 in accordance with various aspects described herein. The ATS 200 differs from the ATU 104 of FIGS. 1A-1B in that it provides additional remapping capabilities without altering the operations of the ATU 104. In particular, the ATS 200 can provide additional address translation capabilities by ignoring certain address bits of the address bus 102 that are not used during the translation process performed by the ATU 104 (e.g., address bits Addr_in[19: 16]). The unused bits are depicted by bus 202, which as will be shown are restored after the translation is performed.

In one embodiment, the ATS 200 comprises two remapping stages 206 and 218 that are positioned, respectively, at the input bus 208 and translated address bus 110 of the ATU 104. The first remapping stage 206 receives inputs from an attribute bus 204 and the address bus 102. The attribute bus 204 can be sourced from, for example, sideband information that is known by and provided by a processor with each transaction on a bus, such as whether a transaction contains code versus data, or whether it is a secure or non-secure transaction, or what domain a transaction is associated with (for processors capable of supporting multiple domains). The processor can represent one or more central processing units (CPUs) executing one or more operating systems, each performing memory management functions. It will be appreciated that the processor may correspond to one or more virtual machines (VMs) that each can be reprogrammed so as to adapt the number of CPUs, memory resources assigned to each VM.

Figure 2B:
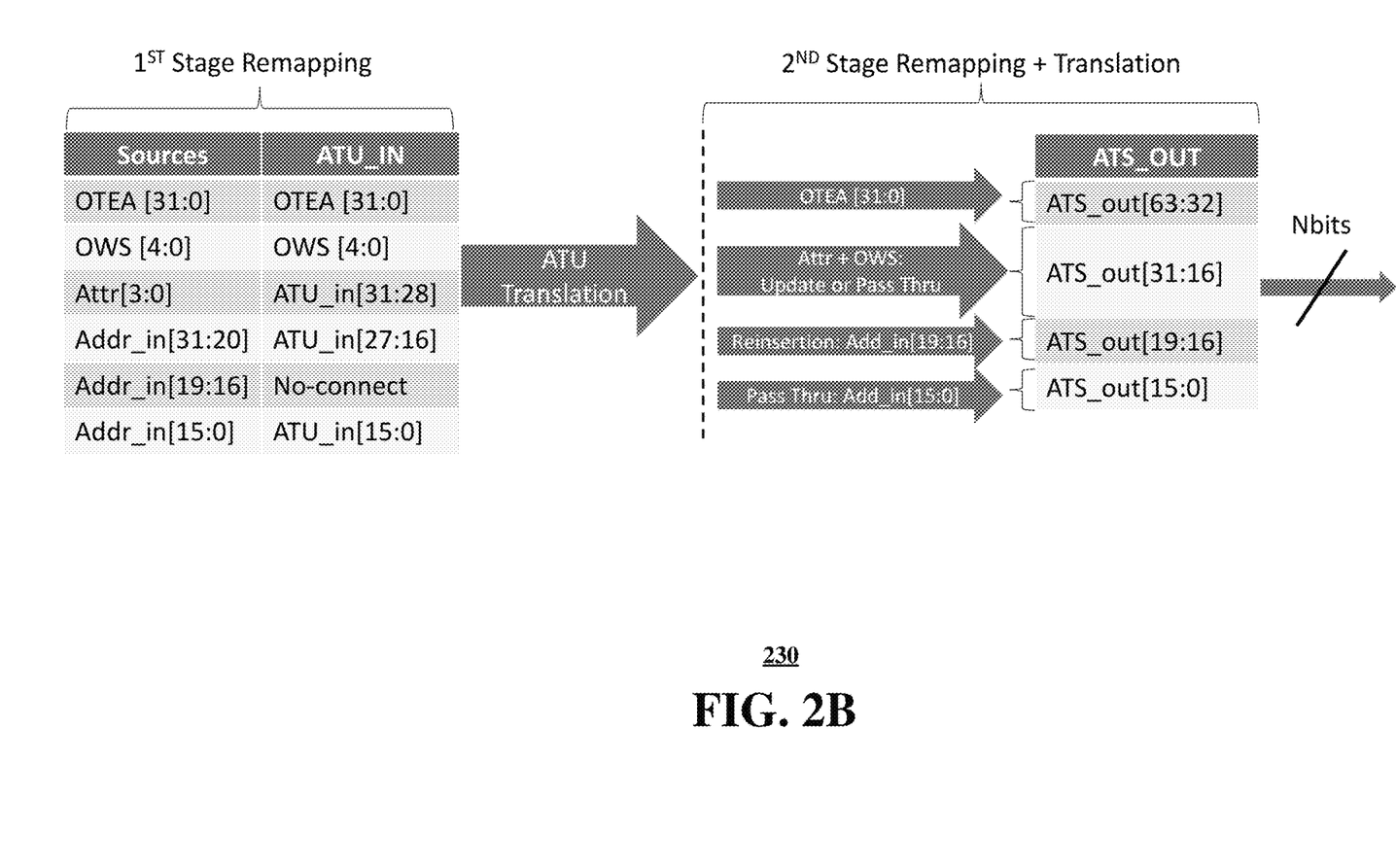
FIG. 2B is a block diagram illustrating an exemplary, non-limiting embodiment of the address translation performed by the ATS of FIG. 2A in accordance with various aspects described herein.

The attribute bus 204 can be used by the one or more operating systems to expand control of the address translation function performed by the ATU 104. FIG. 2B depicts non-limiting embodiments that describe how the remapping stages 206 and 210 can be used without changing the original function of the ATU 104 previously described in FIGS. 1A-1B. In one embodiment, the first remapping stage 206 does not connect to the input bus 208 of the ATU 104 the unused bits of the address bus 102 depicted as Addr_in [19:16] to make room for an attribute bus 204. Instead, the unused bits are fed into the second remapping stage 210 depicted as bus 202. The remaining lower 16 bits of the address bus 102 Addr_in[15:0] are connected to the input bus 208 as ATU_in[15:0].

In one embodiment, the attribute bus 204 can correspond to a 4-bit bus depicted as Attr[3:0] which is remapped by the first remapping stage 206 into the upper 4-bits of the input bus 208 of the ATU 104, depicted as ATU_in[31:28]. In one embodiment, placing the attribute bus 204 in the upper 4-bits of the input bus 208 requires an exact match by the ATU 104 during the matching process. A portion of the remaining upper bits of the address bus 102 Addr_in[31:20] are connected to the remaining upper bits of the input bus 208 of the ATU 104, depicted as ATU_in[27:16]. These bits serve as a 12-bit window base address that are matched subject to the window size provided by the OWS register 108. The foregoing remapping process results in window sizes of the OWS register 108 in increments of 1 MB increments*T1 (where n is the value of the OWS register 108). This results in table entries ranging from, for example, 1 MB (00000) to 2 GB (01011), which is in contrast to the 64 KB increments*2' ranging from 64 KB to 2 GB as described in FIGS. 1A-1B. Although the OWS register 108 has an adjusted window size of 1 MB increments*2", to the ATU 104 the window size increments remain as 64 KB increments*2".

The removal of bit lines Addr_in[19:16] from the input bus 208, makes room for the attribute bus 204, depicted as Attr[3:0], to be connected to the upper 4 bits ATU_in[31:28] of the 32-bit input bus 208. The 12-bit window base Addr_in [31:20] is remapped to ATU_in[27:16] of the 32-bit input bus 208 to make room for the attribute bus 204 in the upper 4 bits of the input bus 208. As previously described, the ATU 104 has two input register inputs 106 and 108, respectively, that for this illustration serve as OTEA register [31:0] and OWS register 108 [4:0], respectively. In this arrangement, the ATU 104 is configured to produce a translated bus that is expanded to 64 bits. The OTEA register [31:0] is supplied to bit lines ATS_out[63:32], while ATU_in[15:0] is supplied to bit lines ATS_out[15:0] with no translation. The ATU 104 will be configured to translate (or not translate) the combination of the attribute bus 204 represented by ATU_in[31:28] and the 12-bit window base Addr_in[31:20] depending on the table entry associated with the window size provided by the OWS register 108. If the portion of the attribute bus 204 located in bit lines ATU_in[31:28] and at least a portion of bit lines ATU_in[27:16] matches the address range in the selected table entry, then the ATU 104 will generate an address translation, which will be placed in bit lines ATS_out[31:16].

If a match does not occur, the ATU 104 will either cause a pass-thru of bit lines ATU_in[31:16], supply a default address to bit lines ATS_out[31:16], or a combination thereof. The second remapping stage 210 can be configured to update the translated address bus 110 and generate a remapped address bus 212. The remapped address bus 212 restores address bit lines Addr_in[19:16] by placing them in bit lines ATS_out[19:16]. This remapping process effectively results in a pass-thru of bit lines Addr_in[19:0] of the address bus 102 to bit lines ATS_out[19:0]. As shown in FIG. 2B, the second remapping stage 210 causes a pass-thru of the OTEA register 106 to bit lines ATS_out[63:32], an address translation (if any) into ATS_out[31:16], a restoration of address bit lines Addr_in[19:16] in bit lines ATS_out[19:16], and a pass thru of Addr_in[15:0] in ATS_out[15:0]. All or a portion of the 64-bit remapped address bus 212 depicted as ATS_out[63:0] is then supplied to IC 112.

The foregoing process takes advantage of unused bit lines from the address bus 102 to add more flexibility in controlling the address translation process performed by the ATU 104 without altering the ATU 104 itself. It will be appreciated that the illustrations of FIGS. 1A-1B and FIGS. 2A-2B can be adapted to more or less bits (e.g., 64-bit line address bus 102 and 128-bit line remapped address bus 212). It will be further appreciated that a larger or smaller attribute bus 204 can be used depending on the input size of the address bus 102 and a number of available unused (untranslatable) bit lines of the address bus 102.

Figure 3:
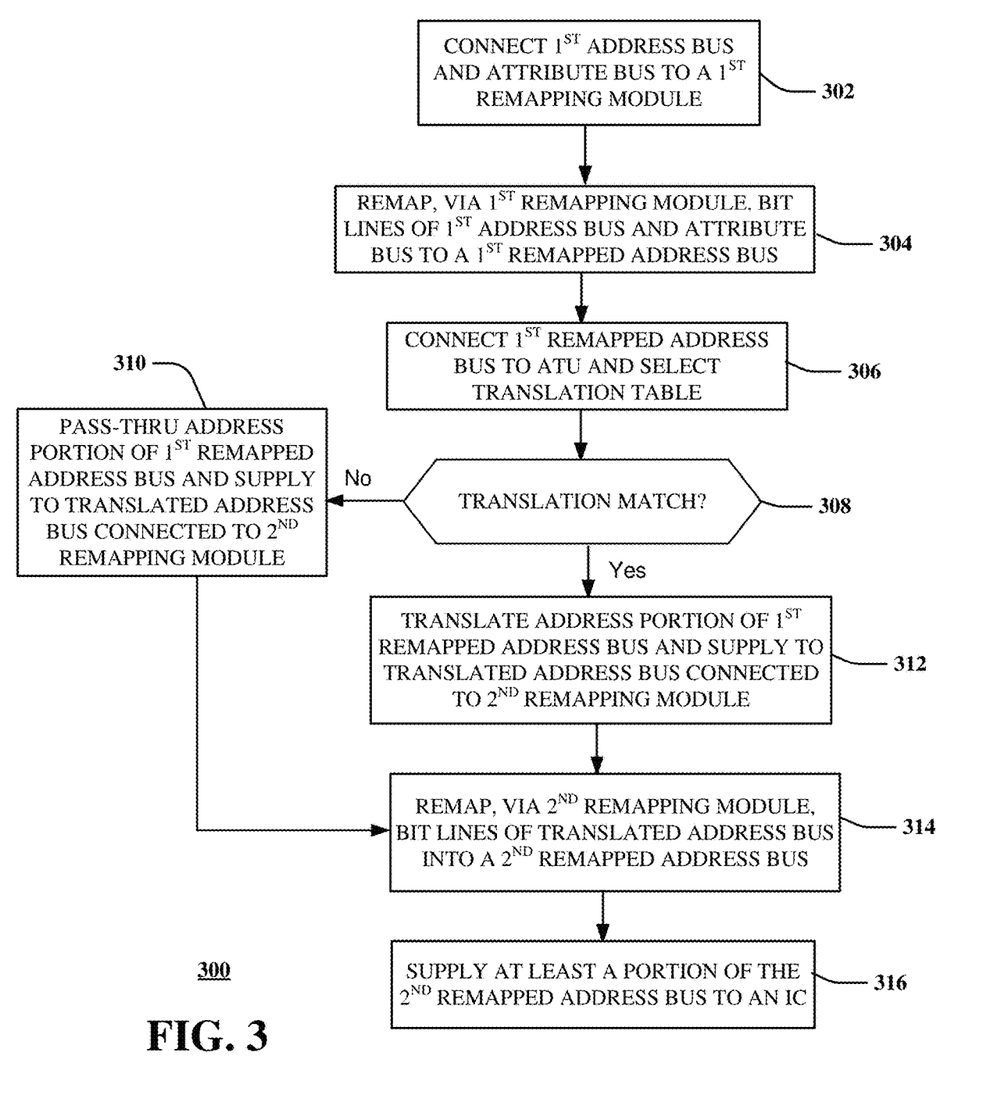
FIG. 3 depicts an illustrative embodiment of a method in accordance with various aspects described herein.

FIG. 3 depicts an illustrative embodiment of a method 300 that can be used to in accordance with various aspects described herein. Method 300 can begin at step 302 in which a first address bus and attribute bus are connected to a first remapping module. The first remapping module is configured to perform bit line remapping to a first remapped address bus. At step 304, for example, bit lines of the first address bus and bit lines of the attribute bus can be remapped by the first remapping module to produce the first remapped address bus. To remap the attribute bus into the first remapped address bus, the first remapping module can be configured to withdraw (or ignore) certain untranslatable bit lines of the first address bus to make room for the attribute bus in the first remapped address bus.

The first remapped address bus is connected to an ATU at step 306. At step 306, the ATU can be configured to select a translation table according to an OWS register (or other data) to perform a translation of address information included in the first remapped address bus into new address information supplied by the ATU to a translated address bus connected to the ATU. In one embodiment, the translated address bus can have the same number of bit lines as the first remapped address bus (e.g., 64-bit address translated to a new 64-bit address). In another embodiment, the translated address bus can have a greater number of bit lines than the first remapped address bus (e.g., 64-bit address translated to a new 128-bit address). Having a greater number of bit lines in the translated address bus enables translating an address domain of the first remapped address bus to another address domain of the translated address bus.

At step 308, the ATU can be configured to determine if a portion of the address information (address bits) supplied in the bit lines of the first remapped address bus matches an address range of the table entry selected at step 306. The address information included in the portion of the bit lines used for determining whether a match exists can include, for example, bit information provided in bit lines of the attribute bus that were remapped at step 304 into bit lines of the first remapped address bus and a portion of the address bits retained in bit lines of the first address bus that were similarly remapped at step 304 into bit lines of the first remapped address bus.

If a match is not detected at step 308, the ATU can proceed to step 310 and pass thru a portion of the address information of the first remapped address bus (or a default address supplied by the table entry) to the translated address bus. If a match is detected at step 308, the ATU can translate at step 312 a portion of the address information in the first remapped address bus and supply the translated address to the translated address bus. At step 314, bit lines of the translated address bus can be remapped, by a second remapping module, into bit lines of a second remapped address bus by, for example, restoring at least a portion of the unused (or ignored) address bit lines of the first address bus that made room for the attribute bus during the remapping process performed by the first remapping module at step 304. The second remapped address bus can be connected in whole or in part at step 316 to an IC device to control, for example, volatile or non-volatile memory usage of the IC device.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
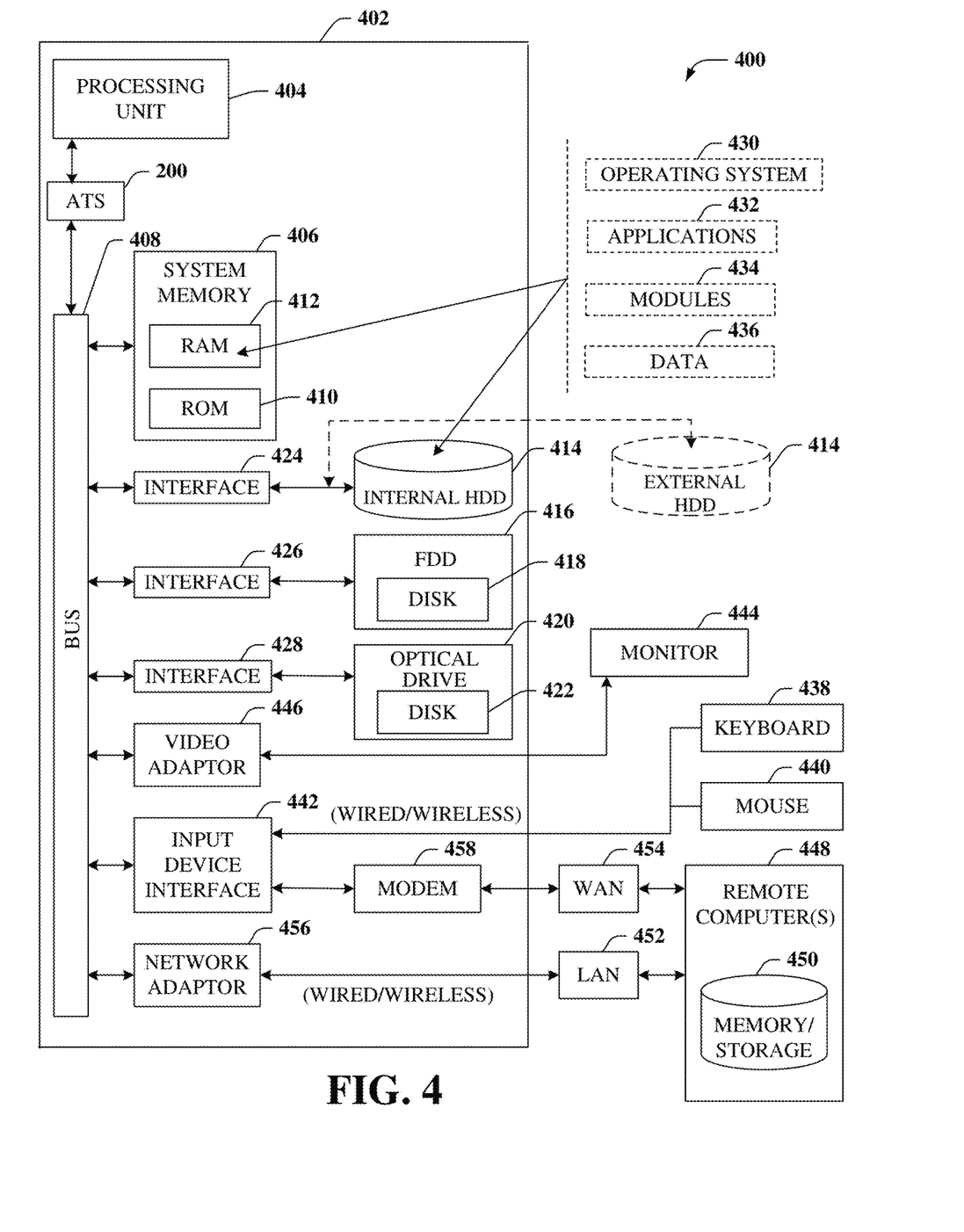
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part portions of the systems of FIGS. 1A and 2A for managing memory usage of any of the volatile or non-volatile memory devices described below for the computing environment 400. Particularly, the processing unit 404 can be configured to use the ATS 200 to perform address translations as previously described in FIGS. 2A-2B. It will be further appreciated that the ATS 200 can be placed in other locations in FIG. 4 such as, for example, between Video Adaptor 446 and the Bus 408, or between Input Device Interface 442 and the Bus 408, or between Network Adaptor 456 and the Bus 408.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory, Flash drive such as a Solid-State Drive (SSD), or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data, Dynamic RAM (DRAM), or combinations thereof.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, a Flash drive such as a Solid-State Drive (SSD), cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

receiving addressable information on an address bus, the addressable information being an address to data stored in a memory;

receiving attribute information on an attribute bus having a number of attribute bit lines, the attribute information characterizing a type of transaction associated with a domain;

remapping the address bus into a first remapped address bus by replacing bit lines of the address bus with the attribute bit lines of the attribute bus, the replacing resulting in substitute bit lines comprising the attribute bit lines and remaining bit lines of the address bus, the first remapped address bus comprising the substitute bit lines and the remaining bit lines of the address bus, and the first remapped address bus supplying updated address information, the updated address information collectively not representing an address to data stored in the memory;

connecting the first remapped address bus to an address translation unit (ATU), the ATU configured to translate the updated address information into translated address information supplied to an expanded address bus at an output of the ATU based on a match of the attribute information in the updated address information with an address range, the attribute information being a subset of the updated address information; and remapping the expanded address bus at the output of the ATU into a second remapped address bus by replacing bit lines of the expanded address bus with the bit lines of the address bus that were replaced by the attribute bit lines, the replacing resulting in restored bit lines and remaining bit lines of the expanded address bus, the second remapped address bus comprising the restored bit lines and the remaining bit lines of the expanded address bus, and the second remapped address bus supplying updated translated address information, the updated translated address information collectively representing an address to data stored in the memory.

2. The method of claim 1, wherein the attribute information comprises sideband information provided by a processor, and wherein the expanded address bus comprises more bit lines than the first remapped address bus.

3. The method of claim 1, further comprising connecting at least a portion of the second remapped address bus to an integrated circuit device to supply at least a portion of the updated translated address information, wherein the integrated circuit device comprises a system on chip.

4. The method of claim 3, wherein the integrated circuit device comprises a central processing unit.

5. The method of claim 1, further comprising connecting a register to the ATU, the register identifying a window size.

6. The method of claim 5, wherein the window size identifies a translation table to be used by the ATU to translate the updated address information into the translated address information.

7. The method of claim 1, further comprising connecting a register to the ATU, the register supplying addressable data to a portion of the expanded address bus.

8. The method of claim 7, wherein the addressable data is supplied to upper bit lines of the expanded address bus.

9. An integrated circuit device, comprising:
a first address bus arranged to carry addressable information which is an address to data stored in a memory; and
an address translation unit (ATU), wherein the integrated circuit is configured for:
remapping the first address bus into a first remapped address bus by replacing bit lines of the first address bus with attribute bit lines of an attribute bus, the attribute bit lines characterizing a type of transaction associated with a domain, the replacing resulting in substitute bit lines comprising the attribute bit lines and remaining bit lines of the first address bus, and the first remapped address bus comprising the substitute bit lines and the remaining bit lines of the first address bus, and the first remapped address bus supplying updated first address information, the updated address information collectively not representing an address to data stored in the memory;
connecting the first remapped address bus to the ATU, the ATU configured to translate the updated first address information into translated address information supplied to a second address bus at an output of the ATU based on a match of the attribute information in the updated address information with an address range, the attribute information being a subset of the updated address information; and
remapping the second address bus at the output of the ATU into a second remapped address bus by replacing a portion of the second address bus with the bit lines of the first address bus that were replaced by the attribute bit lines, the replacing resulting in restored bit lines and remaining bit lines of the second address bus, the second remapped address bus comprising the restored bit lines and the remaining bit lines of the second address bus, and the second remapped address bus supplying updated translated address information, the updated translated address information collectively representing an address to data stored in the memory.

10. The integrated circuit device of claim 9, wherein the integrated circuit device is further configured to supply at least a portion of the updated translated address information to a bus of a system on chip.

11. The integrated circuit device of claim 9, wherein the attribute bit lines comprise sideband information, and wherein the second address bus comprises more bit lines than the first remapped address bus.

12. The integrated circuit device of claim 9, wherein the integrated circuit device is further configured to connect a register to the ATU, the register identifying a window size.

13. The integrated circuit device of claim 12, wherein the window size identifies a translation table to be used by the ATU to translate the updated first address information into the translated address information.

14. The integrated circuit device of claim 9, wherein the integrated circuit device is further configured to connect a register to the ATU, the register supplying addressable data to a portion of the second address bus.

15. The integrated circuit device of claim 14, wherein the addressable data is supplied to upper bit lines of the second address bus.

16. A method performed by an address translation system (ATS), comprising:
remapping a first address bus arranged to carry addressable information which is an address to data stored in a memory into a first remapped address bus by replacing bit lines of the first address bus with attribute bit lines of an attribute bus, the attribute bit lines characterizing a type of transaction associated with a domain, the first remapped address bus supplying updated address information, the updated address information collectively not representing an address to data stored in the memory;
connecting the first remapped address bus to an address translation unit (ATU), the ATU configured to translate the updated address information into translated address information supplied to a second address bus at an output of the ATU based on a match of the attribute information in the updated address information with an address range, the attribute information being a subset of the updated address information; and
remapping the second address bus at the output of the ATU into a second remapped address bus by replacing bit lines of the second address bus with the bit lines of the first address bus that were replaced by the attribute bit lines, the second remapped address bus changing the translated address information into updated translated address information, the updated translated address information collectively representing an address to data stored in the memory.

17. The method of claim 16, further comprising supplying at least a portion of the updated translated address information to a bus of an integrated circuit device.

18. The method of claim 17, wherein the ATS operates in a processor.

19. The method of claim 17, further comprising connecting a first register and a second register to the ATU, the first register identifying a window size, and the second register supplying addressable data to a portion of the second address bus.

20. The method of claim 19, wherein an operating system utilizes the first register, the second register, attribute bus, or combinations thereof to control translation operations performed by the ATS.

21. The method of claim 1, wherein the attribute information indicates an address domain of a plurality of domains.

22. The integrated circuit device of claim 9, wherein the attribute bus indicates an address domain of a plurality of domains.

23. The method of claim 16, wherein the attribute bus indicates an address domain of a plurality of domains.

* * * * *